A. H. EMERSON.
LENS EXAMINING INSTRUMENT.
APPLICATION FILED JUNE 18, 1913.
1,164,795.
Patented Dec. 21, 1915.
2 SHEETS—SHEET 1.
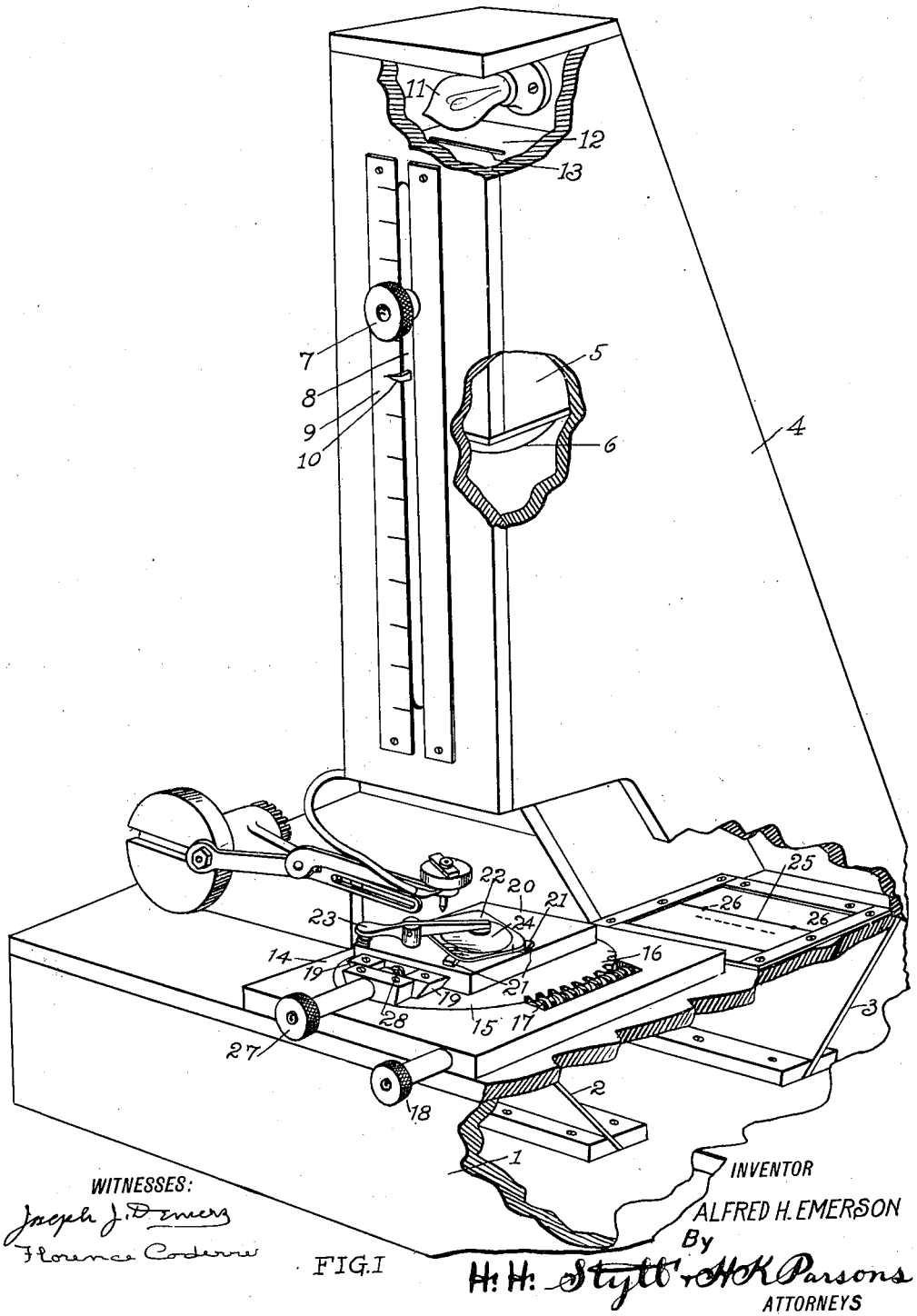
FIG.I
WITNESSES:
INVENTOR
ALFRED H. EMERSON
By
ATTORNEYS

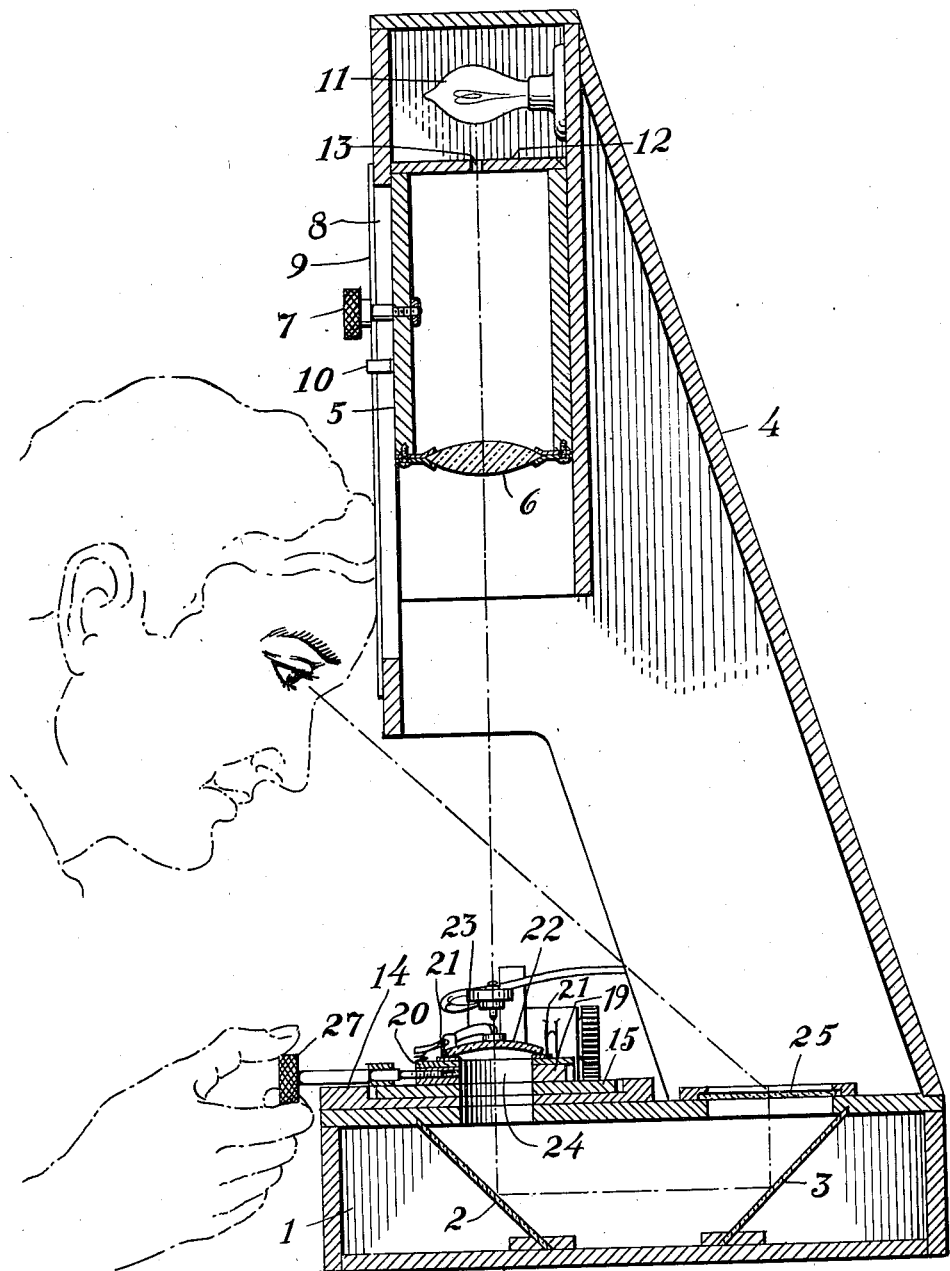

UNITED STATES PATENT OFFICE.

ALFRED H. EMERSON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION.

LENS-EXAMINING INSTRUMENT.

1,164,795.  Specification of Letters Patent.  Patented Dec. 21, 1915.

Application filed June 18, 1913. Serial No. 774,493.

*To all whom it may concern:*

Be it known that I, ALFRED H. EMERSON, a subject of the King of England, residing at Southbridge, in the county of Worcester and State of Massachusetts, have invented certain new and useful Improvements in Lens-Examining Instruments, of which the following is a specification.

My invention relates to improvements in lens examining instruments and has particular reference to means for determining the location of the axis of a cylindrical lens.

The leading object of my invention is the provision of an instrument by the use of which a person without any special training may readily determine the location of the axis of a lens.

A further object of my invention is the provision of an instrument by which the axis of a lens may be quickly and accurately determined and marked.

Other objects and advantages of my improved instrument should be readily apparent by reference to the following description taken in connection with the accompanying drawings, and it will be understood that I may make any modifications in the specific details of construction shown and described within the scope of the appended claims without departing from or exceeding the spirit of my invention.

Figure I represents a perspective view of my complete instrument, parts being broken away to permit of a better understanding of the interior construction thereof. Fig. II represents a vertical sectional view taken centrally through the complete instrument.

In the drawings, the numeral 1 designates the basal or frame portion of my instrument which is preferably hollow and has mounted therein a pair of mirrors 2 and 3 whose purpose will be later described.

Rising from the base is a hollow standard or support 4 having slidably mounted therein a carrier 5 provided with a suitable lens 6 which is preferably in the form of a high power cylinder. An adjusting screw 7 projecting through the slot 8 in the standard 4 serves to regulate the vertical position of the carrier and lens, a scale 9 on the front of the standard coöperating with a pointer or indicating member 10 on the carrier to denote the adjustment. A suitable source of illumination 11 is shown mounted at the upper end of the standard 4, although it will be understood that natural instead of artificial light may be employed at this point as desired. In either event the light strikes the object screen 12, which has a slit 13 formed therein from which light may pass downward through the standard and lens 6.

Disposed directly beneath the standard 4 is a platform or table 14 having rotatably mounted thereon or fitting therein a disk 15 which is preferably rotated by means of the worm teeth 16 meshing with the worm 17 having a knurled operating portion 18 projecting forwardly from the platform 14. Mounted on the disk 15 are the guides 19 for the lens holding table 20 which is preferably provided with a plurality of rests 21 for the lenses 22, a spring actuated clamp 23 being carried by the member 20 to engage the lens and satisfactorily hold the same in position on the rest 21.

It is to be noted that the table 20 has the central aperture 24, while the disk 15 is likewise apertured, thus forming a passage so that the light passing downward from the slit 12 and lens 6 may pass through the lens 22 being tested and continue downward through the said passage and strike the mirror 2, this mirror reflecting the image of the slit 13 onto the mirror 3 which in turn reflects the image onto the ground glass or image screen 25, which is set into the base 1. If the lens is correctly positioned the image of the slit 13 will appear on the screen 25 between the designations 26 thereon, but should the lens be but slightly out of position the reflection of the image will, on account of the position of the mirrors, be considerably displaced, as indicated by the dotted lines. To correctly position the image it is then merely necessary to adjust the lens for angle by rotation of the disk 15 and parts mounted thereon through the medium of the knurled head 18, while back and forth position to cause the image and marks 26 to register together can be attained through turning the knurled head 27 on the adjusting screw 28 which serves to move the table 20 along the guides 19, as will be readily understood by reference to the drawings.

While my improved lens examining instrument is adapted for use in trying out ordinary spectacle lenses, it is particularly adapted for use in testing trial case lenses or any other instances where extreme accuracy is essential.

To satisfactorily mark the axis of the lens when the same has been determined by the use of my instrument I may employ any desired marking mechanism, that illustrated, however, being particularly applicable and efficient. It is then merely necessary to bring the marking device shown at the left in Fig. I down upon the lens, this marking device being so supported that it will come exactly on the axis of the lens when determined, and thus permit of the making of a temporary or permanent record on the lens of the exact position of its axis.

From the foregoing description taken in connection with the accompanying drawings the construction and use of my combined marking and testing instrument should be readily apparent, and it will be seen that I have provided an extremely simple and efficient apparatus for the intended purpose which enables an unskilled person to accurately determine the axis of a lens and by which they can then quickly, easily and with absolute accuracy put suitable indicating marks on the lens.

I claim:

1. An axis finder embodying an illuminated object and an adjustable lens for focusing the same, a holder for the lens to be tested within the path of the rays from the object, said holder being constructed to permit of passage of the rays therethrough, means for reflecting said rays, an image screen for receiving the same, and means for adjusting the lens support.

2. A lens testing device, including a screen, an object, means for illuminating the object, adjustable means for projecting an image of the object in predetermined position on the screen, means for holding the lens to be tested within the path of projection, means for laterally and rotatively shifting the lens, whereby the position of the image on the screen is varied, and means for magnifying the amount of variation of the position of the image.

3. A lens testing instrument embodying means for projecting an image through the lens to be tested, means for magnifying the variation in the position of the image, if any, caused by its passage through the lens, and means for adjusting the lens to correctly position the image.

In testimony whereof I affix my signature in presence of two witnesses.

ALFRED H. EMERSON.

Witnesses:
FLORENCE E. CODERRE,
H. K. PARSONS.